Nov. 26, 1957  J. G. SINCLAIR, JR  2,814,745
HIGH FREQUENCY ALTERNATOR
Filed Oct. 31, 1955  2 Sheets-Sheet 1

INVENTOR.
JOHN G. SINCLAIR JR.,
BY
Henry Heyman
ATTORNEY.

Nov. 26, 1957 J. G. SINCLAIR, JR 2,814,745
HIGH FREQUENCY ALTERNATOR
Filed Oct. 31, 1955 2 Sheets-Sheet 2
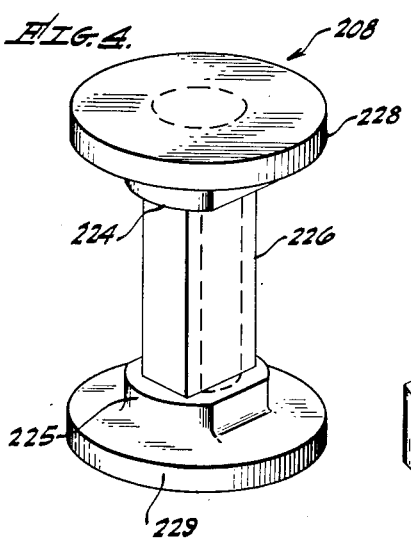
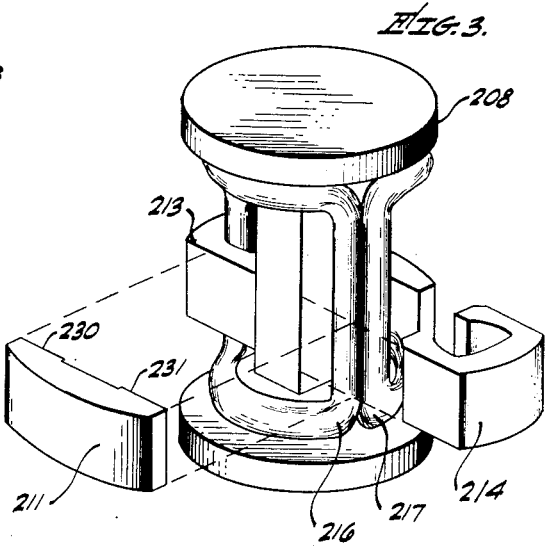
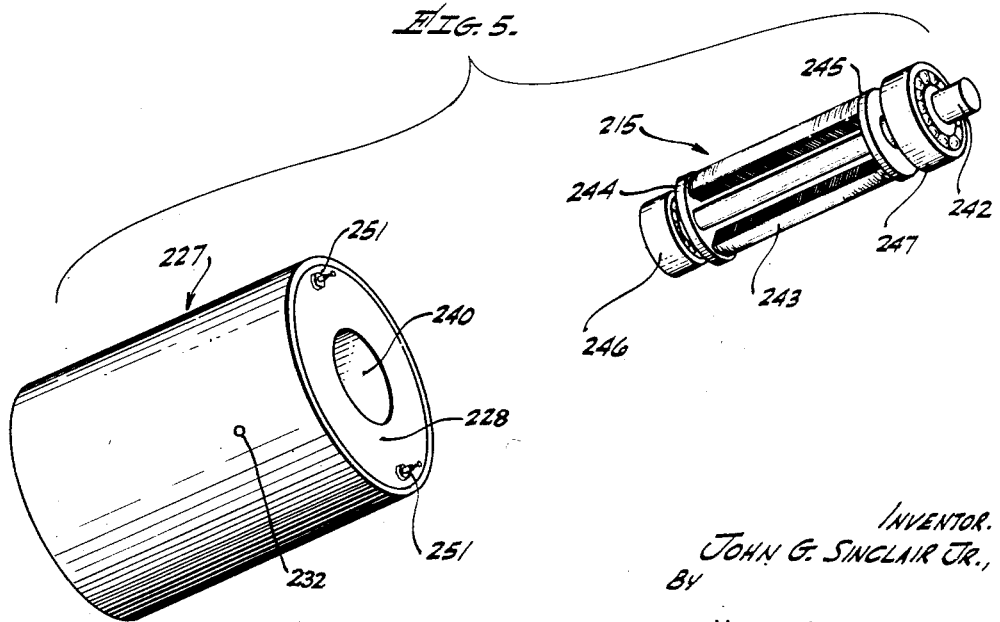
INVENTOR.
JOHN G. SINCLAIR JR.,
BY
Henry Heyman
ATTORNEY.

United States Patent Office 2,814,745
Patented Nov. 26, 1957

2,814,745

HIGH FREQUENCY ALTERNATOR

John G. Sinclair, Jr., Manhattan Beach, Calif., assignor to Hughes Aircraft Company, Culver City, Calif., a corporation of Delaware Application October 31, 1955, Serial No. 544,003

3 Claims. (Cl. 310—155)

The present invention relates to alternators, and more particularly to an improved reluctance type high frequency alternator.

Heretofore, a number of high frequency alternators requiring neither brushes nor slip rings have been proposed. One important class of such alternators is the so-called "reluctance type" which, in general, is characterized by the feature that the stator carries both the field excitation windings and the output windings of the alternator, the rotor being composed of a soft iron structure without windings. The requirement that the stator structure include provisions for both field excitation and output windings has severely complicated the design of such alternators, the prior art designs generally being difficult to fabricate, and operating at low efficiency from a volumetric standpoint. While permanent magnets have frequently been substituted for the field windings, the forms of such alternators heretofore proposed have not been such as to effect a maximum utilization of the materials required for their construction. In addition, the failure to realize a substantially cylindrical configuration in the alternators of the prior art has tended to reduce their power handling capabilities because they can not dissipate heat efficiently.

It is therefore an object of the present invention to provide a reluctance alternator which overcomes the above and other disadvantages of the prior art and is characterized by a compactness and efficiency heretofore unknown in the art.

Another object of the present invention is to provide a reluctance type alternator which utilizes permanent magnets to provide excitation for the alternator without detracting from the symmetry and compactness of the structure, the magnets themselves operating at maximum efficiency.

Yet another object of the present invention is to provide a reluctance type alternator which may be assembled from readily fabricated parts, including prewound and preformed coils, thus considerably simplifying the stops required to produce the alternator.

A further object of the present invention is to provide a reluctance type alternator in which the external surface of the stator substantially conforms to a section of a cylinder, thereby enhancing the dissipation of heat from the alternator.

A still further object of the present invention is to provide a reluctance type alternator which requires less copper wire than typical alternators of the prior art, the output voltage and power being otherwise identical.

A reluctance type alternator, according to the present invention, comprises a stator including a pair of stator field pieces each being substantially C-shaped and disposed with their windows in confronting relationship, the ends of the C-shaped stator field pieces forming four poles about a multipole rotor; magnetizing means disposed in the stator for establishing magnetic fields through the stator field pieces and the rotor, and a pair of output coils wound on the stator to pass through the windows of each of the stator field pieces.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 3 is an exploded view in perspective of an embodiment of the stator of the present alternator partly assembled.

Fig. 4 is a perspective view of an aluminum form useful in assembling the present alternator.

Fig. 5 is an exploded view illustrating the manner of inserting the rotor in an alternator constructed according to Figs. 3 and 4.

Figure 1A:
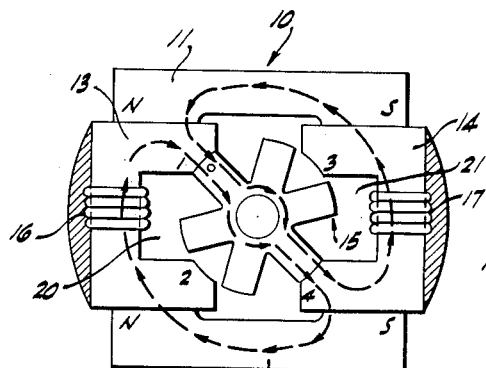
Figs. 1a and 1b are cross sectional views of a typical reluctance alternator of the prior art.
Figure 1B:
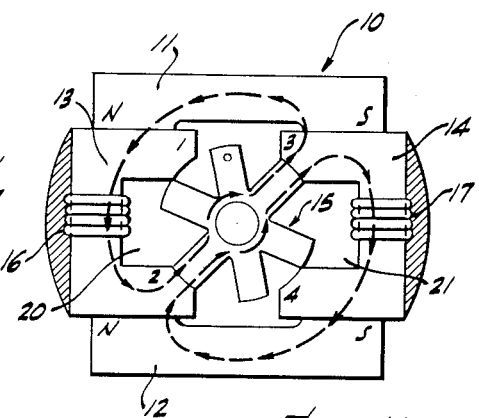

Referring now to the drawings, there are shown in Figs. 1a and 1b diagrams of a reluctance alternator of the prior art which may be utilized to illustrate how a voltage is generated thereby. A stator, generally designated 10, comprising a pair of permanent field magnets 11 and 12 and a pair of laminated soft iron field pieces 13 and 14 is arranged to provide four poles numbered 1, 2, 3, and 4 displaced 90° with respect to each other and confronting a rotor 15. The outside of the base of each of the field pieces 13, 14 is straight. A pair of output coils 16 and 17 is wound on each of stator pieces 13 and 14, the coils being interconnected in an appropriate manner to furnish their outputs either in series or parallel in accordance with the polarity of the currents appearing therein. Rotor 15 is composed of soft iron and has six poles positioned at 60° intervals with respect to each other. Permanent magnets 11 and 12 are magnetized with their north ends adjacent to stator poles 1 and 2 and their south ends adjacent to stator poles 3 and 4. With the rotor in the position shown in Fig. 1a, the flux from permanent magnets 11 and 12 will follow the path shown by the dashed line threading upward through both of coils 16 and 17. It will be seen that the flux traversing each coil substantially corresponds to the flux of a single magnet. When the rotor turns 30 mechanical degrees, the relative position of rotor and stator will correspond to Fig. 1b, where the rotor pole previously in alignment with stator pole 1 has been indicated by a small circle. The flux path will now be seen to be downward through each of coils 16 and 17 corresponding to a flux reversal of 180°. Thus, the flux direction will be seen to have reversed in 30 mechanical degrees of rotor rotation, producing in accordance with well known electro-magnetic principles an induced output current in each of coils 16 and 17. This flux reversal will continue cyclically as the rotor continues to rotate, resulting in the production of an alternating output current having six cycles per rotor revolution and an amplitude which is a function of the speed of rotor rotation and the intensity of the flux field produced by the field magnets.

Figure 2A:
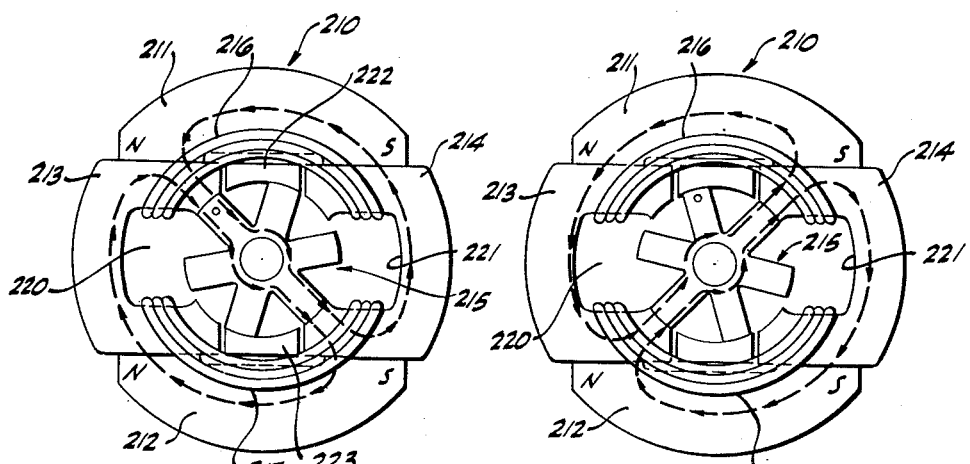
Figs. 2a and 2b are similar cross sectional views of an embodiment of the reluctance alternator of the present invention.
Figure 2B:
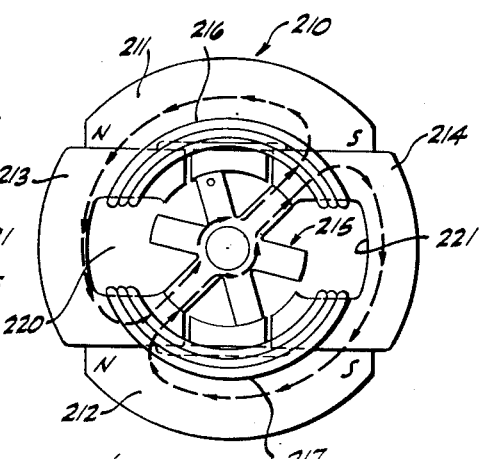

Referring now to Figs. 2a and 2b, there are shown similar cross-sectional views of one embodiment of the reluctance alternator of the present invention. As shown in Figs. 2a and 2b, the stator, generally designated 210, comprises a pair of permanent field magnets 211 and 212 and a pair of stator field pieces 213 and 214 arranged to provide four poles displaced 90° with respect to each other and confront a rotor 215. More particularly, each of stator field pieces 213 and 214 is substantially C-shaped in configuration with their inner openings or "windows" 220, 221 arranged in confronting relationship. The outside of each leg of each of field pieces 213 and 214 is substantially straight, while the tips of each piece curve inwardly to form the stator poles. The outside of the base of each piece, opposite the tips, should have a curvature substantially corresponding to the external diameter of the finished alternator. Field magnets 211 and 212 have a cross-section substantially corresponding to a segment of a circle of the same diameter, the magnets being magnetized to have their north and south poles lying adjacent one another along the chord of the segment as shown. Each of magnets 211 and 212 is placed adjacent stator field pieces 213, 214 so as to establish north and south poles in the tips of each of the field pieces. Thus, as shown in Figs. 2a, 2b, magnets 211 and 212 are arranged with their north poles adjacent field piece 213, while their south poles fall adjacent field piece 214. Coils 216 and 217 are wound on stator 210 to pass through each of windows 220 and 221 in such manner that instead of encircling each stator piece the stator pieces substantially encircle the coils. The end portions of each coil which interconnect the portions passing through windows 220, 221 may conveniently be arranged to fall adjacent magnets 211 and 212, as shown, in order to permit entry of the rotor. Rotor 215 is substantially identical to rotor 15, having six equally spaced rotor poles.

As shown in Fig. 2a, magnets 211 and 212, when arranged as described, will produce two flux paths again shown by dashed lines in the stator field pieces and rotor, each of the flux paths passing through both coils rather than through a single coil. The flux intersected by coil 216 for example, with the rotor in the position shown in Fig. 2a, will be seen to correspond to twice the flux traversing the coil in the prior art embodiment. When the rotor turns 30 mechanical degrees, the relative position of rotor and stator will correspond to Fig. 2b where it will be seen that the flux path is now upward through each of coils 216 and 217 corresponding to a flux reversal of 180°. The flux will again be seen, however, to correspond to the total flux produced by both magnets. Thus, while the flux direction reverses for 30 mechanical degrees of rotor rotation as in Figs. 1a and 1b, the amplitude of flux reversal corresponds to the total flux produced by both magnets rather than that produced by a single magnet.

Accordingly, if each of coils 216 and 217 has the same number of turns as coils 16 and 17, the embodiment of the invention of Figs. 2a and 2b will produce twice the output voltage as that developed by the prior art alternator. On the other hand, in the prior art alternator, each of windows 20 and 21 contains the turns of but a single coil while in the case of the present invention both coils pass through each of windows 220 and 221. For an embodiment of the present invention substantially identical in dimension to that of the prior art, each of coils 216 and 217 will accordingly be limited to one-half the number of turns of those of coils 16 and 17, where copper wire of the same cross-sectional area is utilized in each case. While the new configuration thus limits each coil to one-half its former number of turns, the output voltage generated by each coil will be substantially identical with that of Figs. 1a and 1b, since twice the flux now traverses each coil. At the same time, since each coil only has one-half the number of turns formerly required, the wire requirements for the embodiment of Figs. 2a and 2b may become considerably less than those required for Figs. 1a and 1b.

It will also be readily recognized that coils 16 and 17 must be wound with the turns of the coils passing across the outside of pieces 13 and 14 fanned out into the shaded areas shown in Figs. 1a and 1b, if an alternator of minimum diameter is desired. On the other hand, the alternator of the present invention may utilize prewound coils which do not pass about the outside of the stator, and accordingly such winding precautions need not be taken.

In order to protect magnets 211 and 212 from strong demagnetizing forces which would occur during external short circuit of the output coils, use may be made of an additional short-circuited winding disposed within the stator in a plane parallel to the shaft of rotor 215 and disposed to surround the rotor, the portions of the winding parallel to the rotor shaft indicated by 222 and 223 being disposed intermediate stator poles of opposite polarity. As will be described more fully hereinafter, this shorted turn need not be fabricated from an additional winding but may comprise the remaining portions of a form about which the other elements of the stator are assembled.

Referring now to Fig. 3, there is shown an exploded view in perspective of one embodiment of an alternator according to the present invention. As shown in Fig. 3, the embodiment includes, as stator elements, an aluminum core form 208 around which are placed a pair of preformed output coils 216 and 217; two sets of stator field pieces 213 and 214 and a pair of stator field magnets 211 and 212, arranged to be enclosed by a cylindrical shell of aluminum or similar material, as shown in Fig. 5. More particularly, aluminum core structure 208, as shown in Fig. 4 comprises an oblong rectangular section 226 terminated at each end by a pair of end plates 228 and 229. Rectangular form 226 in horizontal cross section has a length slightly greater than the diameter of the rotor to be utilized with the alternator and a width slightly less than the diameter of the rotor. Each of end plates 228 and 229 forms an end plate of the final assembled alternator and accordingly is of appropriate dimension to so function.

Rectangular form 226 has a height substantially corresponding to the height of the active elements of the rotor and stator field pieces. Each end of form 226 is joined to the adjacent end plate by means of a substantially cylindrical section 224 and 225 respectively, which are shaped to provide supports for the curved end portions of each of the output coils to be described more fully hereinafter. Output coils 216 and 217 (Fig. 3) are identical and may be initially wound as substantially rectangular solenoidal coils of appropriate dimension and thereafter formed to a cylindrical curvature appropriate to the other dimensions of the alternator. More particularly, each of the coils is wound in a substantially rectangular form so that the length of the finished coil is slightly greater than the length of the active portion of the rotor and the stator field laminations and slightly less than the distance between the inner facing surfaces of each of end plates 228 and 229. Each of the coils should have a width such that when the coils are shaped in semi-circular form and placed on opposite sides of winding shoulders 224 and 225, the long portions of each coil will fall on opposite sides of rectangular bar 226, the adjacent sides of each of coils 216 and 217 being contiguous and parallel to each other. The end portions of each coil may be shaped prior to assembly or alternatively each of the coils may be wound to its desired shape following techniques well known in the art.

Stator field pieces 213 and 214 are each built up of a plurality of thin laminations of soft magnetic material, having a substantially C-shaped configuration, the outer opposite sides of each piece being substantially straight while the tips of each lamination curve inwardly to form the stator poles. The stator laminations are arranged to be stacked against the long faces of form 226, each lamination encircling the adjacent turns of coils 216 and 217 in so doing. The outer surface of each lamination, opposite the tips of the lamination, should have a curvature substantially corresponding to the curvature of the inner surface of the shell within which the stator structure is to be placed, and the length of each lamination may be appropriately dimensioned. Similarly the outer width of each lamination should be slightly greater than the length of rectangular form 226.

The sides of the laminations when stacked in place will thus be seen to be disposed in parallel planes adjacent and parallel to the planes of the narrower surfaces of rectangular form 226. In order to insure intimate contact between field magnets 211, 212, and stator field pieces 213 and 214, these surfaces may be ground flat to a desired degree of smoothness.

Field magnets 211 and 212 may be fabricated from a standard configuration of Alnico or similar permanent magnet material in order to insure the proper curved grain orientation for flux when finished to a final curvilinear form. The magnets are ground or similarly cut off to provide pole faces 230 and 231 lying in substantially the same plane and dimensioned to provide that each of the pole faces is adjacent the corresponding side of stator field pieces 213 and 214 when the magnets are in place. The outside of each magnet piece may be ground to a substantially semi-circular shape conforming to the inner dimension of the shell within which the stator structure is to be placed. A magnet structure of such shape will be seen to occupy the maximum volume of the available remaining space within the stator structure. While each of field magnets 211 and 212 may be fabricated from a single piece of material and may have a height substantially corresponding to the height of rectangular form 226, each magnet may preferably be fabricated from two or more identical pieces of appropriate height as shown in Fig. 3, wherein magnet 211 is shown to be a height less than the available space.

Field magnets 211 and 212 need not be magnetized prior to assembly but such magnetization may conveniently be carried out after assembly of the complete alternator.

Following assembly of the core form, coils, stator field pieces, and stator magnets in their appropriate positions, shell 227 (see Fig. 5) may be slipped over the stator in order to retain the elements in their respective positions. The stator assembly thus formed may be impregnated with resin or similar material in order to form a substantially unitary structure and maintain all of the elements in their respective positions. A hole 232 may be provided in the side of shell 227 to permit entry of the resin.

As shown in Fig. 5, rotor assembly 215 comprises a drive shaft 242 upon which are arranged a plurality of rotor laminations 243. The rotor laminations 243 are composed of soft iron similar to stator field pieces 213 and 214 and are shaped to provide six radial rotor poles around their outer periphery. The rotor laminations may be held in place on shaft 242 by means of a pair of end plates 244, 245, pressed on drive shaft 242.

In order to complete the assembly of the alternator a hole 240 may now be drilled in aluminum form 208 for receiving the rotor assembly 215 shown in Fig. 5.

Hole 240 should be of a diameter slightly greater than the external diameter of rotor laminations 243 in order to provide a small air gap between the rotor and stator. In order to support and maintain rotor shaft 242 in proper alignment within the alternator, form 208 may be cut away either inside or outside its end plates to receive a set of bearings 246 and 247. Thus, for example, bearing 246 may be positioned within a depression cut in end plate 229 at the bottom of hole 240. If the outer diameter of the bearing is selected to be slightly less than the diameter of hole 240 the bearing may be slipped into place without difficulty. Similarly, a cut-out or depression may be cut in end plate 228 of a diameter slightly greater than the diameter of hole 240 for receiving bearing 247. If the depression or holes on each of the end plates are of a diameter comparable to the outside diameter of the bearing, the bearing may be pressed into place and retained by utilizing the press fit rather than an additional retaining means.

In accordance with the relative dimensions previously outlined for rectangular form 226, the drilling of hole 240 through the form will result in the formation of two members between the end plates and located adjacent each of magnets 211 and 212. In conjunction with the end plates these two parts will form the protective conductive ring previously described for protecting the permanent magnets against de-magnetizing forces in the presence of short circuits.

During assembly of the alternator appropriate provision may be made for establishing electrical interconnection with the ends of output coils 216 and 217, as, for example, by means of a pair of terminals 250 and 251 located on end plate 228.

The embodiment of the present invention shown and described will thus be seen to be adapted for mass production assembly. Since the magnetic elements of the stator are arranged to substantially encircle the output coils rather than having the output coils wound directly on the stator, the coils may be prewound and preformed to their appropriate shape. Thereafter, the stator elements are placed in their proper relative position with respect to the coils and the rotor inserted to complete the assembly of the alternator. It will readily be recognized that such a mode of assembly considerably simplifies that required in the prior art, since the coils need not be wound in place on the stator, a procedure ordinarily requiring extreme care and precision. The ease and accuracy of assembly of the alternator of the present invention is further enhanced by the fact that use may be made of an aluminum core structure about which the stator coils, core pieces, and magnets may be readily assembled. This core need not be removed from the stator following assembly and in fact forms an important part of the final structure. The aluminum core structure, besides maintaining the elements in their proper axial relationship extends radially at each end to form the end plates for the alternator. Accordingly, after placing the coils, stator core pieces, and magnets in their proper positions, assembly of the stator may be completed by slipping a cylindrical shell over these elements. The resulting structure forms a completely closed cylindrical unit. The rotor may be placed in this structure by drilling a hole through the end plates of appropriate diameter to permit the rotor to be slipped into position with its axis coincident with the axis of the stator configuration. If the aluminum core structure is appropriately dimensioned, the boring operation will not remove all of the aluminum core structure interconnecting the end plates from the assembly. These remaining portions serve to form the shorted protective turn described above.

While the present invention has been particularly shown and described as comprising a four-pole stator and a six-pole rotor, it will readily be understood that other multiples of stator and rotor poles may be utilized without departing from the intent and scope of the present invention.

What is claimed as new is:

1. A reluctance type alternator including a rotor and a stator, said rotor including a drive shaft of non-magnetic material adapted to be driven by a rotary motive source; a plurality of rotor laminations of soft magnetic material co-axially disposed on said drive shaft at right angles thereto, each of said rotor laminations comprising a ring having an internal diameter substantially corresponding to the external diameter of said drive shaft and a plurality of rotor poles extending radially from the outside of said ring, said rotor poles being equiangularly disposed about said ring, the tips of said rotor poles lying along segments of a common circle defining the external diameter of said rotor, said ring having a width in the plane of said lamination substantially corresponding to one-half the width of each of said rotor poles; said stator including a pair of stator field pieces, stator field magnets and a pair of output coils, said stator field pieces each including a plurality of substantially C-shaped stator field laminations with their inner openings arranged in confronting relationship with said rotor, the tips of each of said C-shaped laminations being arranged to lie along a circle having a diameter slightly greater than the diameter of said rotor, the outer side of the base of each field lamination having a curvature substantially corresponding to the external diameter of said stator, the outer sides of each leg of each of said field laminations being substantially straight, said pair of stator field pieces being symmetrically disposed on opposite sides of said rotor with the corresponding outer sides of the legs of each of said field pieces lying in common planes on opposite sides of said rotor; said stator field magnets being composed of magnetic material having high retentivity, each of said field magnets having a shape substantially corresponding to a cylindrical segment defined by the external diameter of said stator and one of said common planes, said field magnets being disposed adjacent said field pieces with their flat faces in contact therewith, said magnets being magnetized to have their north and south poles adjacent one another along said common plane; said pair of output coils each being wound to pass through the inner openings of each of said stator field pieces, portions of said coils being arranged to pass on opposite sides of said drive shaft adjacent each of said field magnets; and means for maintaining said stator field pieces, field magnets and output coils in their respective relative positions, said means comprising a pair of conductors disposed on opposite sides of said rotor and parallel to the axis thereof, said conductors being substantially rectangular in cross section and being arranged to maintain the confronting tips of said stator field pieces in spaced apart relationship; a pair of circular conductive end plates at each end of said stator, said end plates being integrally connected to said conductors, and a cylindrical shell of conductive material enclosing said stator field pieces, stator field magnets and output coils, said shell electrically interconnecting said end plates.

2. A method for assembling the stator of a reluctance-type alternator, said method comprising the steps of shaping an electro-conductive member to receive the elements of the stator and hold said elements against inward radial and axial movement, said elements having been previously shaped to their final dimensions, assembling the elements of the stator about said member in the positions they will occupy in the finished stator, enclosing the assembly thus formed within a retaining shell to prevent outward radial movement of the elements, and drilling a hole through a portion of said member for receiving the rotor of said alternator.

3. The method set forth in claim 2, including the additional step of drilling a hole in said retaining shell and impregnating the enclosed assembly with an insulating material prior to the step of drilling the hole to receive the rotor.

References Cited in the file of this patent

UNITED STATES PATENTS

| | | |
|---|---|---|
| 1,151,530 | Neuland | Aug. 24, 1915 |
| 1,405,180 | Bouche | Jan. 31, 1922 |
| 2,423,345 | Roters | July 1, 1947 |
| 2,562,283 | Sawyer | July 31, 1951 |

FOREIGN PATENTS

| | | |
|---|---|---|
| 137,089 | Great Britain | Dec. 22, 1919 |